（12) United States Patent
Takahata et al.

(10) Patent No.: US 8,396,660 B2
(45) Date of Patent: Mar. 12, 2013

(54) ROAD MAP DATA STRUCTURE, ROAD MAP DATA STORAGE MEDIUM, NAVIGATION DEVICE, AND METHOD OF GENERATING ROAD MAP DATA

(75) Inventors: Seiji Takahata, Nishio (JP); Kimiyoshi Sawai, Okazaki (JP); Motohiro Nakamura, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 608 days.

(21) Appl. No.: 12/449,168

(22) PCT Filed: Mar. 18, 2008

(86) PCT No.: PCT/JP2008/055793
§ 371 (c)(1),
(2), (4) Date: Apr. 20, 2010

(87) PCT Pub. No.: WO2008/126683
PCT Pub. Date: Oct. 23, 2008

(65) Prior Publication Data
US 2010/0235083 A1    Sep. 16, 2010

(30) Foreign Application Priority Data
Mar. 27, 2007    (JP) ................. 2007-082178

(51) Int. Cl.
*G01C 21/00* (2006.01)
(52) U.S. Cl. ........................ 701/450; 701/532
(58) Field of Classification Search .............. 701/409, 701/450, 532
See application file for complete search history.

(56) References Cited

U.S. PATENT DOCUMENTS

| | | | |
|---|---|---|---|
| 6,636,802 B1 * | 10/2003 | Nakano et al. | 701/532 |
| 7,657,372 B2 * | 2/2010 | Adachi et al. | 701/448 |
| 7,890,252 B2 * | 2/2011 | Sekine et al. | 701/428 |
| 2005/0058155 A1 | 3/2005 | Mikuriya et al. | |
| 2008/0091344 A1 | 4/2008 | Mikuriya et al. | |

FOREIGN PATENT DOCUMENTS

| | | |
|---|---|---|
| JP | A-2001-209302 | 8/2001 |
| JP | A-2004-28846 | 1/2004 |
| JP | A-2004-219999 | 8/2004 |
| JP | A-2005-070482 | 3/2005 |
| JP | B2-3725022 | 12/2005 |
| JP | A-2006-220756 | 8/2006 |
| WO | WO 2006/085412 A1 | 8/2006 |

OTHER PUBLICATIONS

Office Action issued in Japanese Patent Application No. 2007-082178 dated Sep. 8, 2011 (with translation).

* cited by examiner

*Primary Examiner* — Hussein A. Elchanti
(74) *Attorney, Agent, or Firm* — Oliff & Berridge, PLC

(57) ABSTRACT

A road map data structure includes road network data Rn, representing roads by a connection relation of a plurality of links L, in a hierarchical structure of a plurality of levels, in which, as a link ID for each link L at a lowest level, consecutive serial IDs, according to a connection order of the links within a link line ML formed of a plurality of the consecutive links having a common attribute, are assigned to first links L1 which have a corresponding link existing at a higher level, and a permanent ID, irrelevant with the connection order of the links, is assigned to a second link L2 which does not have a corresponding link existing at a higher level.

7 Claims, 7 Drawing Sheets

F I G . 1
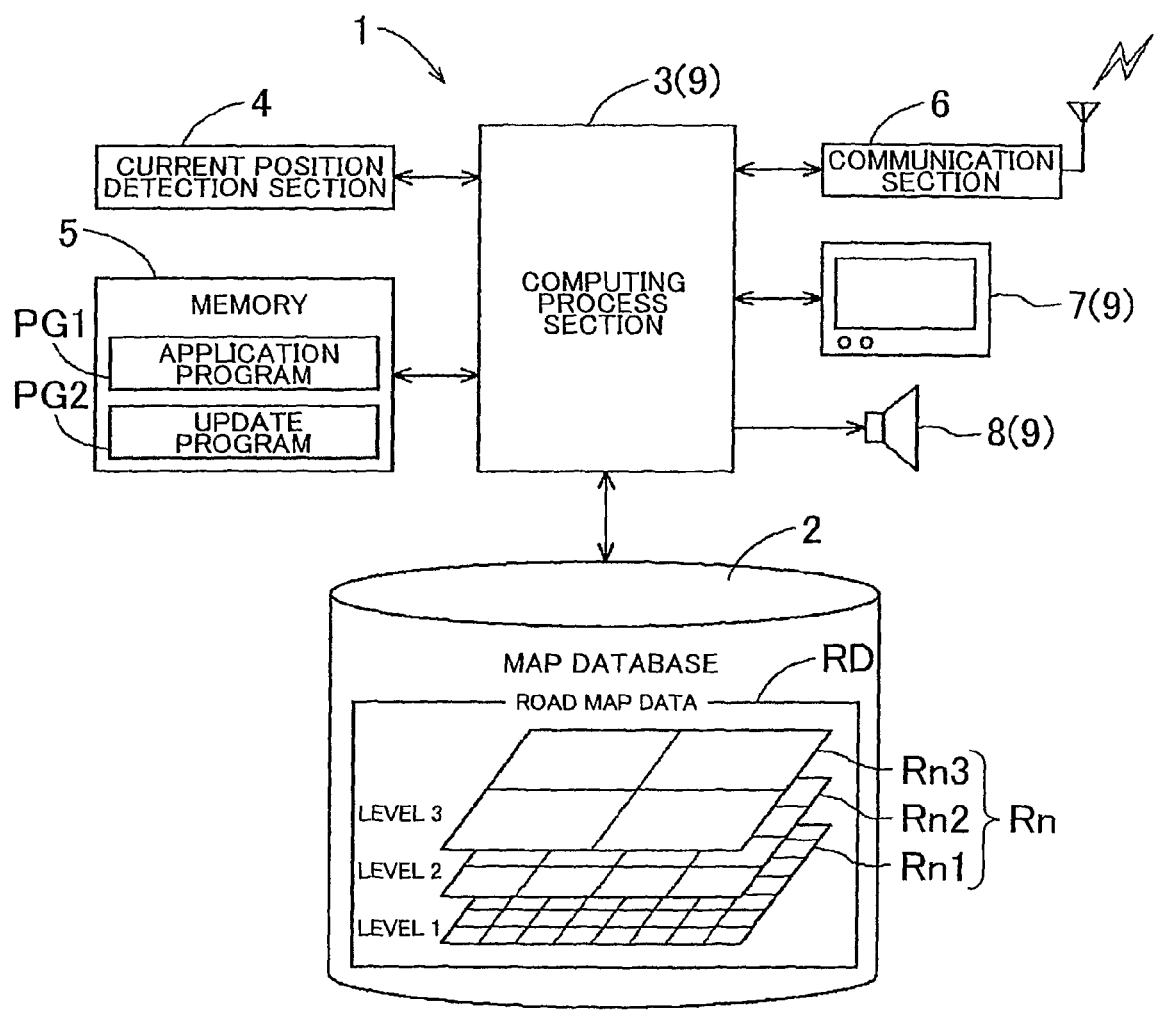

F I G . 2
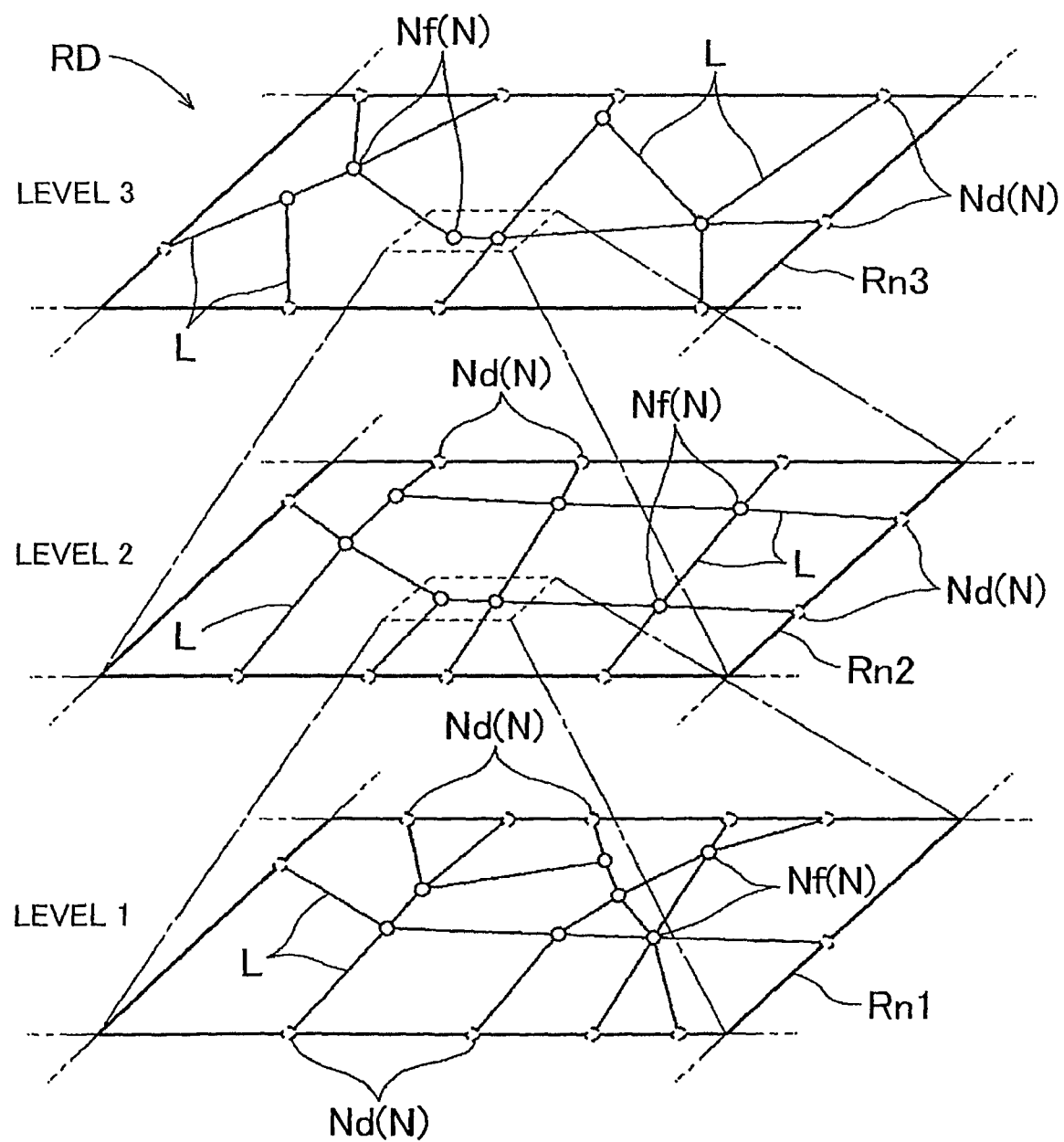

| ITEM NAME | DATA SIZE |
|---|---|
| PERMANENT ID IDENTIFICATION FLAG | 1bit |
| (FREE SPACE) | 1bit |
| LINK ID INFORMATION | 30bit |

| LINK ID | ATTRIBUTE DATA |
|---|---|
| 001 | ····· |
| 002 | ····· |
| 003 | ····· |
| ⋮ | ⋮ |

ROAD MAP DATA STRUCTURE, ROAD MAP DATA STORAGE MEDIUM, NAVIGATION DEVICE, AND METHOD OF GENERATING ROAD MAP DATA

TECHNICAL FIELD

The present invention relates to a structure of road map data used in, for example, a navigation device and the like, and relates to a road map data structure including road network data, representing roads by a connection relation of a plurality of links, in a hierarchical structure of a plurality of levels, a road map data storage medium recording the same, a navigation device using the same, and a method of generating such road map data.

BACKGROUND ART

Generally, technology of performing current position display, route guidance to the destination, and the like using road map data which is digital data representing information of roads in the real world have been known for navigation devices and the like. Such road map data often includes road network data of a plurality of levels according to the degree of detail, the scale display, and the like of stored road information, and has a structure in which the roads are represented by a connection relation of a plurality of links in the road network data of each level. Regarding a link ID for identifying each link forming such road network data, a structure has been known in which consecutive link ID numbers, according to the connection order within a link line formed of a plurality of consecutive links having a common attribute, are assigned to the links (for example, see Japanese Patent No. 3725022).

More specifically, in the road map data structure described in the Japanese Patent No. 3725022, the range of the link ID number is set for each link of the lowest level of the road network data of the plurality of levels. The plurality of links forming one link line are set with a range of the consecutive link ID numbers. For example, four consecutive links forming one link line are respectively set with link ID number ranges of 1000 to 1099, 1100 to 1199, 1200 to 1299, and 1300 to 1399 as the link ID. In the case where the plurality of links of a lower level are integrated to represent one link of a higher level, the link ID of each link can be represented by the link ID number range in the same manner as that of a lower level by integrating the consecutive link ID number ranges. For example, in this case where the four links are integrated as one link, the link ID of the link becomes 1000 to 1399.

DISCLOSURE OF THE INVENTION

Problem to be Solved by the Invention

In the road map data structure described above, the link ID number range in which the link ID number range of each link of a lower level are integrated becomes the link ID of each link at a higher level, whereby the correspondence relation between a higher level and a lower level on the application program side of a navigation device or the like can easily be comprehended. Therefore, the load of a computing process, such as the route search to the destination and route result display performed at a lower level based on the search result at a higher level, on the application program side which refers to the road network data of the plurality of levels for operation can be reduced to advantageously increase the process speed.

However, the road map data structure described above has a problem in that the process of updating data is complicated. For example, in the case of adding a link representing a road intersecting with another road, a node is added to a position corresponding to a new intersection in one existing link to segment the link into two links. Thus, it is necessary to assign a new link ID to each of the segmented two links. In order to maintain the consecutiveness of the link ID number ranges in the link line, it is necessary that the link ID of the two segmented links be set in consideration with the link IDs of the links preceding and following each link. Therefore, there is a problem in that the computing process for setting the link ID for a data update is complicated.

Of the road network data pieces of the plurality of levels, the road network data of the lowest level includes links for roads of all road types of the road map data, for example, an expressway and toll road, a national road, a main regional road, a prefectural road, a general road, and a street. Of the various roads, the main roads are included in the road network data of a higher level, but many roads, such as the streets, are not included in the road network data of a higher level.

The present invention has been made in view of the above problems, and has an object of providing a road map data structure capable of reducing the load of the computing process for setting a link ID when updating road map data, a road map data storage medium recording the same, a navigation device using the same, and a method of generating such road map data.

Means for Solving the Problem

A road map data structure according to an aspect of the present invention for achieving the above object includes road network data, representing roads by a connection relation of a plurality of links, in a hierarchical structure of a plurality of levels, in which, as a link ID for each link at a lowest level, consecutive serial IDs, according to a connection order of the links within a link line formed of a plurality of the consecutive links having a common attribute, are assigned to first links which have a corresponding link existing at a higher level, and a permanent ID, irrelevant with the connection order of the links, is assigned to a second link which does not have a corresponding link existing at a higher level, as a featured configuration.

According to the featured configuration of the road map data structure described above, the permanent ID, irrelevant with the connection order of the links, is assigned to the second link, which does not have a corresponding link existing at a higher level, of the links of the lowest level. Thus, regarding the second links existing in large numbers in the road network data of the lowest level, it is unnecessary to take into consideration the consecutiveness of the link ID with those of links connected at both ends in the same link line when assigning a new link ID for an update and the like of the road map data. Therefore, the load of the computing process for setting a link ID when updating the road map data can be further reduced than a conventional load. Further, since the link ID of the second link is the permanent ID irrelevant with the connection order of the links, the relation between the link ID and the link is unchanged semipermanently, whereby an update of relating attribute data and the like upon changing the link ID becomes unnecessary. Therefore, the amount of process for the update of the road map data can be reduced. Moreover, since a correspondence relation of the second link with a link of a higher level is unnecessary, a problem of, for example, an increase of load or decrease of process speed of the computing process on the application program side of the navigation device or the like is unlikely to occur, even when the link ID irrelevant with the connection order of the links is assigned.

The first links, which have a corresponding link existing at a higher level, are assigned with the consecutive serial IDs according to the connection order in the link line. Thus, regarding the first link, the correspondence relation between a higher level and a lower level can easily be comprehended. Therefore, the load and process speed of the computing process on the application program side of the navigation device or the like which refers to the road network data of the plurality of levels for operation can be approximately the same as those of a conventional data structure.

The serial IDs are suitably set as a number range including a plurality of consecutive numbers.

With such configuration, an update of adding a new link can be performed for the first link, which has a corresponding link existing at a higher level, while maintaining the consecutiveness of the link IDs, without changing the link IDs of the surrounding links. Therefore, the load and process speed of the computing process on the application program side of the navigation device or the like which refers to the road network data of the plurality of levels for operation can be maintained after the update.

The permanent ID is suitably the same as an ID assigned to each link in original map data from which the road network data is generated.

With such configuration, the load of the computing process when assigning the link ID to the second link in the case of generating road map data based on the original map database can further be reduced.

Data representing the link ID suitably has a permanent ID identification flag representing whether or not the link ID is the permanent ID.

With such configuration, whether the link ID of each link is the serial ID or the permanent ID can easily be identified on the application program side of the navigation device or the like, for example.

The road map data of the road map data structure including each configuration described above is stored in a storage medium to be suitably utilized as a road map data storage medium.

A navigation device according to an aspect of the present invention includes a map database storing road map data having the data structure of each configuration described above, a current position detection means which detects a current position, an application program which refers to the road map data for operation, and a guidance information output means which operates according to the application program to output guidance information, as a featured configuration.

According to the featured configuration, it is unnecessary to take into consideration the consecutiveness of the link ID with those of the links connected at both ends in the same link line when assigning a new link ID, regarding the second links existing in large numbers in the road network data of the lowest level, when the road map data in the map database of the navigation device is updated. Therefore, the load of the computing process for setting the link ID when updating the road map data can be further reduced than a conventional load. Regarding the second link, since the relation between the link ID and the link is unchanged semipermanently, the update of the relating attribute data and the like upon changing the link ID becomes unnecessary, whereby the amount of process for the update of the road map data can be reduced. Further, since a correspondence relation of the second link with a link of a higher level is unnecessary, the problem of an increase of load or decrease of process speed of the computing process on the application program side is unlikely to occur, even when the link ID irrelevant with the connection order of the links is assigned. Regarding the first link, the correspondence relation between a higher level and a lower level can easily be comprehended. Therefore, the load and process speed of the computing process on the application program side can be approximately the same as those of a conventional navigation device.

A method of generating road map data according to an aspect of the present invention includes converting a data structure of original map data in which each link for forming road network data is represented by a combination of a permanent ID and attribute data, to generate road map data including the road network data in a hierarchical structure of a plurality of levels, in which, as a link ID for each link at a lowest level, consecutive serial IDs, according to a connection order of the links within a link line formed of a plurality of the consecutive links having a common attribute, are assigned to first links which have a corresponding link existing at a higher level, and a permanent ID of each link set in the original map data is assigned without change to a second link which does not have a corresponding link existing at a higher level, as a featured configuration.

According to the featured configuration, the second link, which does not have a corresponding link existing at a higher level, of the links of the lowest level is assigned with the permanent ID set in the original map data without change. Thus, the second links existing in large numbers in the road network data of the lowest level can be assigned with the same permanent ID as that of the original map data without change, even when a new link ID is to be assigned due to an update of the road map data and the like. Therefore, it is unnecessary to take into consideration the consecutiveness of the link ID with those of other links connected at both ends in the same link line, whereby the load of the computing process for setting the link ID when updating the road map data can be further reduced than a conventional load. Further, since the link ID of the second link is the same permanent ID as that in the original map data, the relation between the link ID and the link is unchanged from the original map data, whereby the update of the relating attribute data and the like upon changing the link ID when the road map data is generated or updated becomes unnecessary. Therefore, the amount of process for generating or updating the road map data can be reduced. Moreover, since a correspondence relation of the second link with a link of a higher level is unnecessary, a problem of, for example, an increase of load or decrease of process speed of the computing process on the application program side of the navigation device or the like is unlikely to occur, even when the road map data is generated in such manner. The first links, which have a corresponding link existing at a higher level, are assigned with the consecutive serial IDs according to the connection order in the link line. Therefore, the road map data, in which the correspondence relation between a higher level and a lower level can easily be comprehended regarding the first link, can be generated.

BRIEF DESCRIPTION OF THE DRAWINGS

FIG. 1 is a block diagram showing a schematic configuration of a navigation device according to an embodiment of the present invention.

FIG. 2 is a diagram showing the relation of one parcel of road network data among different layers.

DESCRIPTION OF THE REFERENCE NUMERALS

Figure 3:
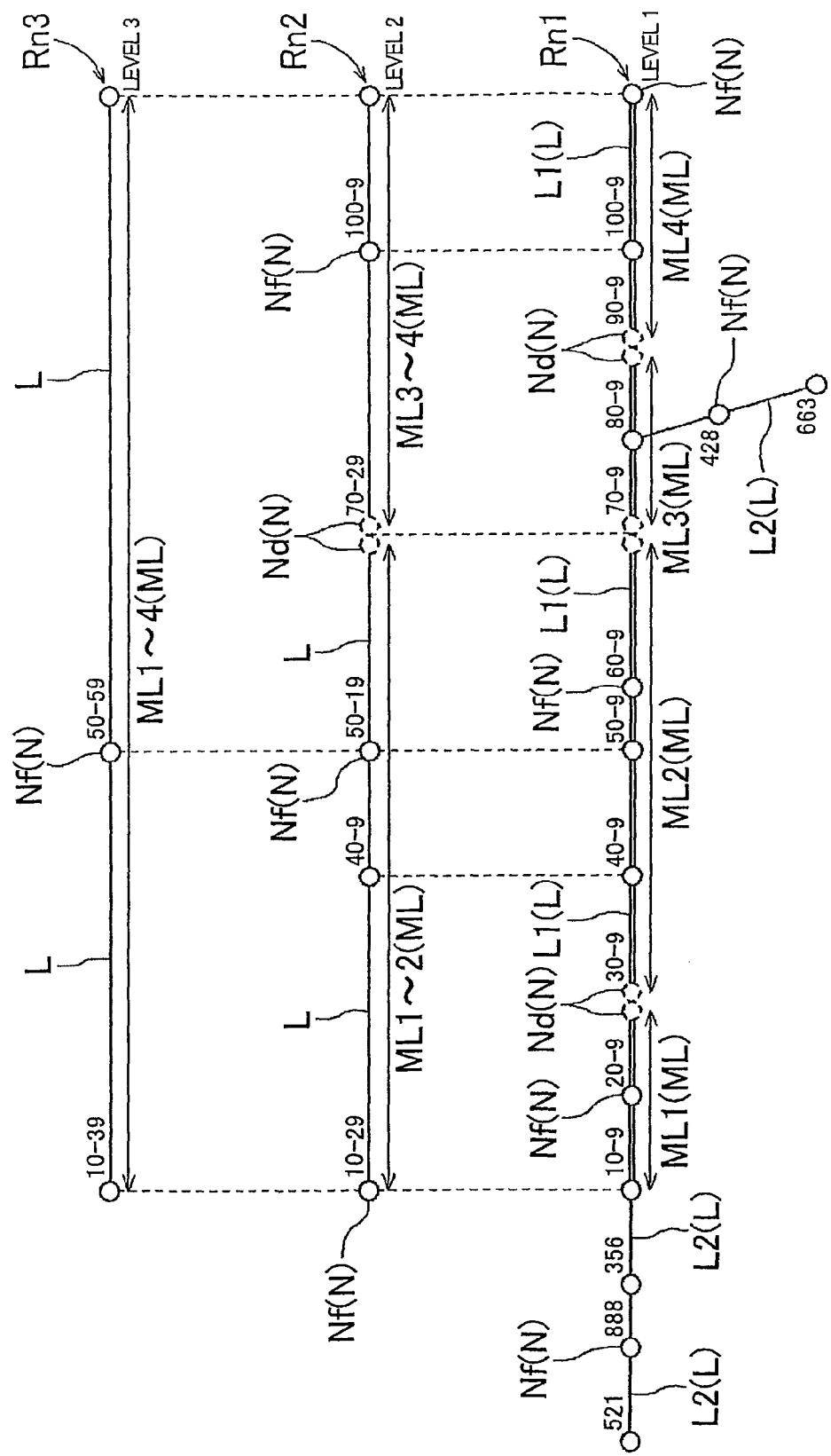
FIG. 3 is a diagram showing an example of the setting of a link ID of each link forming the road network data.

1: Navigation device
2: Map database (road map data storage medium)
4: Current position detection section (current position detection means)
9: Guidance information output means
13: Comparison map database (road map data storage medium)
RD: Road map data
Rn: Road network data
ML: Link line
L: Link
L1: First link
L2: Second link
PG1: Application program
D1: Original map data

BEST MODES FOR CARRYING OUT THE INVENTION

An embodiment of the present invention is described based on the drawings. FIG. 1 is a block diagram showing a schematic configuration of a navigation device 1 according to this embodiment. The navigation device 1 is capable of achieving a general navigation function such as current position display, route search from the point of departure to the destination, course guidance to the destination, and retrieval of the destination. Therefore, as shown in FIG. 1, the navigation device 1 includes a map database 2, a computing process section 3, a current position detection section 4, a memory 5, a communication section 6, a display input section 7, and a voice output section 8. In each of these function sections of the navigation device 1, one or both of hardware and software (program) is installed to form the function section for performing various processes with respect to input data, with the computing process section 3 formed of a central processing unit (CPU) and the like as a main member. The configuration of each section is described below.

The map database 2 is a database storing road map data RD referred to by the computing process section 3 which operates according to an application program PG1 described below. The map database 2 includes a device having a rewritable storage medium, for example, a hard disk drive and a flash memory, and a driving means thereof as a hardware configuration. In this embodiment, the map database 2 corresponds to the "road map data storage medium" storing the road map data RD of the present invention. The road map data RD stored in the map database 2 includes a featured data structure according to the present invention. Note that, although omitted in the drawing, the map database 2 stores various data (guidance data) for display, guidance, retrieval, and the like used in the application program PG1 other than the road map data RD. These pieces of data specifically include image data, voice data, point of interest (POI) data, and the like, and each piece of data is associated with a link, node, and the like (see FIG. 2) included in the road map data RD and stored. The configuration of the road map data RD is described below in detail.

As shown in FIG. 1, the road map data RD includes road network data Rn of a plurality of levels (Rn1 to Rn3) in a hierarchical structure according to the degree of detail, scale display, and the like of stored road information. The road network data Rn of each level is data schematically representing roads in the real world by a connection relation of a plurality of links L (see FIG. 2). In this example, the road network data Rn has three levels of level 1 to level 3. Of the three levels, level 1 is the lowest level, level 2 is at a higher level, and level 3 is at a further higher level. Note that, in the description of this embodiment, the reference symbol "Rn" is used to generically refer to the road network data Rn of each level, and the reference symbols "Rn1" to "Rn3" are respectively used for level 1 to level 3 in order to distinguish each level. The road network data Rn includes more detailed road information at lower levels. The road network data Rn1 of level 1 which is the lowest level includes information on roads of all road types in the road map data, and specifically includes information of, for example, a) expressways and toll roads, b) national roads, c) main regional roads, d) prefectural roads, e) general roads, and f) streets. In the road network data Rn2 and Rn3 of level 2 and level 3 which are higher levels, information on roads of the road types which are not important for the route search and the like is omitted. Specifically, for example, information of f) streets is excluded in the road network data Rn2 of level 2, and information on d) prefectural roads and e) general roads is further excluded in the road network data Rn3 of level 3.

Each of the road network data Rn1 to Rn3 of each level is segmented into a plurality of parcels. The road network data Rn of a higher level is set with parcels corresponding to wider areas in the real world. FIG. 2 is a diagram showing the relation of one parcel of the road network data Rn among different layers. As shown in the drawing, one parcel of a higher level includes an area corresponding to a plurality of parcels of a lower level. The road network data Rn of each level has a structure in which the plurality of links L are connected via a node N provided at the end portion of each link N. Each node N is basically set corresponding to an intersection in the real world, and each link L is set corresponding to a road connecting each intersection. Note that, in the case where the link L crosses a border of the parcel, a dummy node Nd is set on the border of the parcel regardless of the intersection in the real world. That is, the node N includes two types of nodes of a real node Nf set corresponding to the intersection in the real world, and the dummy node Nd set on the border of each parcel regardless of the intersection.

The information representing the node N and the link L forms data of each level (level 1 to 3) aligned for each link line (multilink) ML (see FIG. 3), formed of a plurality of consecutive links having a common attribute, according to the connection order in the link line ML. In this example, road name information showing the name of a road in the real world, for example, National Route 1 and Meishin Expressway, is used as a common attribute which defines each multilink ML. The links L corresponding to roads of the same road name are grouped together within a parcel as long as possible to form one link line ML. Note that the common attribute which defines each multilink ML is not limited to the road name information, and other attributes of the road or link, for example, the road type, the number of lanes, and the road width may also be used.

The road map data RD includes attribute data of the links L and the nodes N grouped together for each link line ML. The attribute data of the node N includes, for example, coordinate information showing the coordinate of each node N, information showing whether the node is the dummy node Nd or the real node Nf, information showing a traffic regulation, information showing the highest level (level 1 to 3) at which each node N exists, information showing the presence or absence of a signal, and the like. The attribute data of the link L includes, for example, link ID information showing a link ID of each link described below, shape information showing the shape of each link L, information showing the traffic regulation, information showing the road type, the road name information, information showing the width, information showing the number of lanes, information showing the highest level (level 1 to 3) at which each link L exists, and the like.

Each link L in the road map data RD is assigned with the link ID as a non-overlapping unique identifier (ID) for identifying each link. The road map data RD has a structure in which two types of ID, a serial ID and a permanent ID, are assigned as the link ID according to the type of the link L. Specifically, in the road map data RD, each link of level 1 which is the lowest level is classified as a first link L1 which has a corresponding link existing at level 2 as the higher level, or a second link L2 which does not have a corresponding link existing at level 2 as the higher level. The road map data RD has a structure in which the consecutive serial IDs, according to the connection order of each link line ML in the link line ML, are assigned as the link IDs of the first links L1, and the permanent IDs, irrelevant with the connection order of the links, are assigned as the link IDs of the second links L2. The configuration of such link IDs is described below in detail.

FIG. 3 is a diagram showing an example of the setting of the link ID of each link L forming the road network data Rn1 to Rn3 of each level. In the drawing, a double line in the road network data Rn1 of level 1 which is the lowest level shows the first link L1, which has a corresponding link existing at level 2 as the higher level. A single line in the road network data Rn1 of level 1 shows the second link L2, which does not have a corresponding link existing at level 2 as the higher level. Note that such classification is not performed for the links L of the road network data Rn2 and Rn3 of level 2 and level 3. In FIG. 3, a full-line circle shows the real node Nf, and a dotted-line circle shows the dummy node Nd. Two dummy nodes Nd are disposed adjacent to each other at a single position since the dummy nodes Nd are set on the boundary of the parcels. The two adjacent dummy nodes Nd show that the corresponding dummy nodes Nd are set on the same coordinate on the boundary of each of the parcels adjacent to each other. Note that the link L of an intersecting road connected to each real node Nf is basically omitted in the drawing for simplification.

The first link L1 is set with the serial ID. The serial ID is an ID formed by assigning any one of consecutive numbers, characters, or codes according to the connection order in the link line ML of each link, or a combination thereof to each link L. In this example, the serial ID is set as a number range including a plurality of consecutive numbers. Thus, the serial ID is represented by a combination of a lower limit number in the number range and the difference between the lower limit and a higher limit. For example, in the case where the link ID is "10-9," "10" is the lower limit number in the number range, and "9" is the difference between the lower limit and the higher limit, whereby consecutive numbers (natural numbers in this example) of 10 to 19 are assigned as the link ID. Note that, in this example, the consecutive serial IDs having number ranges of 10, such as "10-9," "20-9," "30-9," . . . , are set as the link IDs of the first links L1, as shown in FIG. 3. With the link ID of the first link L1 being such serial ID, in the case where a plurality of first links L1 are integrated in the road network data Rn2 and Rn3 of higher levels, a link ID of the integrated link L can be represented in the same manner as the first link L1 in the road network data Rn1 of level 1. Specifically, in the case where three links L of "10-9," "20-9," and "30-9" are integrated, for example, the link ID of the integrated link L can be represented as "10-29." Accordingly, the link ID is commonly used for the corresponding links L at a higher level and a lower level. Therefore, the correspondence relation of the link L between a higher level and a lower level can easily be comprehended on the application program PG1 side.

In the example shown in FIG. 3, the link line ML formed by a set of the first links L1 of the road network data Rn1 of level 1 is segmented into four link lines of a first link line ML1, a second link line ML2, a third link line ML3, and a fourth link line ML4 via the dummy nodes Nd. A single road given the same road name is thus segmented, since the road exists over four parcels of level 1. The plurality of link lines ML1 to ML4 are integrated in the road network data Rn2 and Rn3 of higher levels. In this example, the first link line ML1 and the second link line ML2 are integrated to form a link line ML1-2, and the third link line ML3 and the fourth link line ML4 are integrated to form a link line ML3-4 in the road network data Rn2 of level 2. Further, these link lines are integrated to form a link line ML1-4 in the road network data Rn3 of level 3. Therefore, in such cases, it is desirable to assign the consecutive serial IDs according to the connection order as the link IDs to the links over the plurality of consecutive link lines ML1 to ML4 as in this example. Accordingly, when the links L forming each link line ML1 to ML4 are integrated in the road network data Rn2 and Rn3 of higher levels, the link ID of the integrated link L can be represented in the same manner as that of the first link L1 in the road network data Rn1 of level 1. Therefore, the correspondence relation of the link L between a higher level and a lower level can easily be comprehended on the application program PG1 side in this case as well.

The second link L2 is set with the permanent ID. The permanent ID is an ID formed of any one of a number, character, or code irrelevant with the connection order of the links, or a combination thereof. In this example, the permanent ID is an arbitrary three-digit number, for example, "521," "888," and "356," as shown in FIG. 3. The numbers are described as few-digit numbers for simplification, and in reality, large-digit numbers, for example, 10- to 15-digit numbers are preferable to avoid overlapping of the IDs for a number of links. Only decimal numbers are used in the example shown in FIG. 3. However, characters of A to F may be used in the case of using hexadecimal numbers, or other characters or codes may commonly be used. It suffices that the permanent ID of each second link L2 is a unique ID which does not overlap within the road map data RD, and the assignment thereof is not limited by other conditions such as the connection order in the link line ML. In this example, the permanent ID is the same as the link ID of each link L assigned in original map data D1 (see FIG. 5) from which the road network data Rn is generated.

Figures 4, 5, 6:
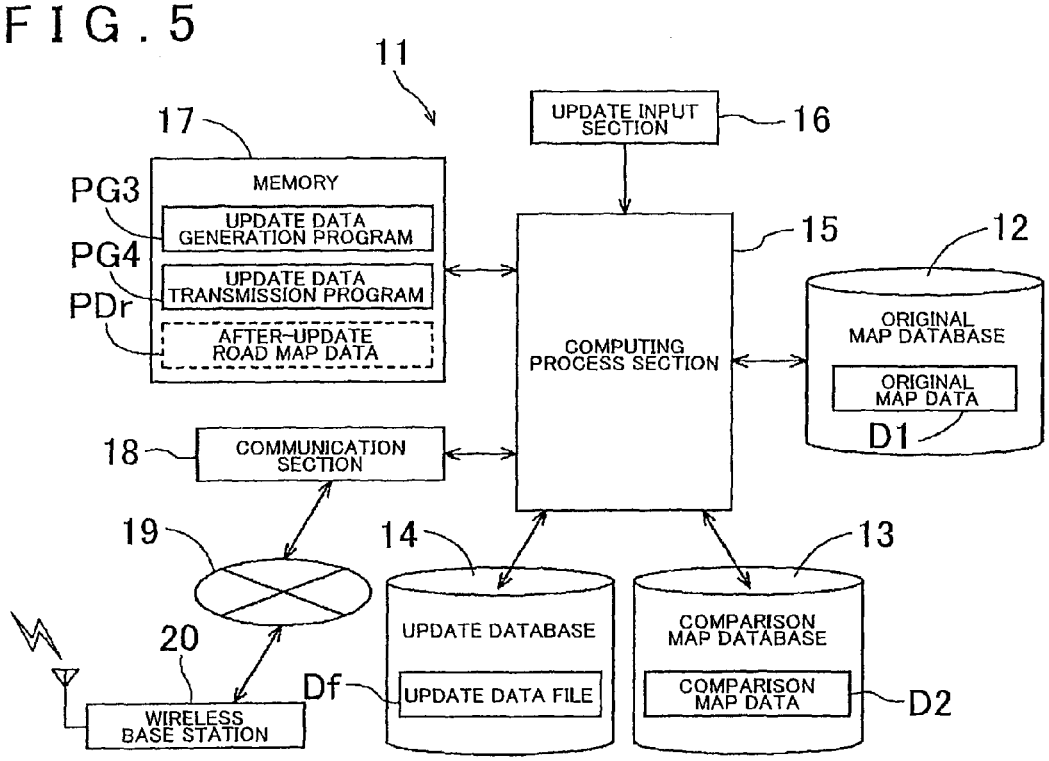
FIG. 4 is a diagram showing an example of a specific configuration of link ID data.
FIG. 5 is a block diagram showing a schematic configuration of a map update server device according to an embodiment of the present invention.
FIG. 6 is a diagram schematically showing the structure of original map data.

The data representing the link ID of each link L included in the road map data RD has a permanent ID identification flag representing whether or not the link ID is the permanent ID. FIG. 4 is a diagram showing a specific example of a configuration of link ID data. In this example, the link ID data is formed from a data amount of 32 bits (4 bytes). 1 bit thereof forms the permanent ID identification flag, and the data can represent the serial ID in the case where the 1 bit is "0," and the permanent ID in the case where the 1 bit is "1," for example. Further, 30 bits form the link ID information as the substantial information of the link ID. The remaining 1 bit is a free space.

The computing process section 3 is a computing process function section which operates according to the application program PG1 stored in the memory 5, and is formed of a known computing process means such as a CPU as described above. Although omitted in the drawing, the application program PG1 includes, for example, a display program, a map-matching program, a route search program, a guidance program, a retrieval program, and the like. The display program is a program for performing map display of the area around the current position, destination, or the like on the display screen of the display input section 7, as well as the current position display and the like on the map. The map-matching program is a program for performing a map-matching process of adjusting the current position detected by the current position detection section 4 to be on a road on the map. The route search program is a program for performing a route search of searching, for example, a guidance route from the point of departure such as the current position to the destination input by the display input section 7, and the like. The guidance program is a program for performing a process of guiding a user along an appropriate course by guidance display through the display screen of the display input section 7, a voice guidance through the voice output section 8, and the like according to a route to the destination determined by the route search program. The retrieval program is a program for retrieving the destination, a location for the map display, or the like based on an address, a telephone number, a facility name, a category, and the like. Note that, since the operation process of the navigation device 1 by the computing process section 3 which operates based on each of the programs is known, a detailed description thereof is omitted. The computing process section 3 which operates according to the application program PG1 refers to the road map data RD stored in the map database 2 as map information.

The memory 5 also stores an update program PG2 for causing the computing process section 3 to perform a process of updating the road map data RD based on an update data file Df supplied from a map update server device 11 described below. In this embodiment, as described below, the update data file Df is a file merging data of portions to be updated with respect to the road map data RD stored in the map database 2. Thus, the road map data RD can be updated by a rewrite and the like of the portion of the road map data RD to be updated with the data included in the update data file Df.

The current position detection section 4 is a function section for detecting the present position of the navigation device 1. Therefore, although not shown in the drawing, the current position detection section 4 includes, for example, a GPS receiver, a direction sensor, a distance sensor, and the like. Based on information acquired therefrom, the current position detection section 4 acquires information such as the coordinate showing the present position, the traveling direction, and the like, and outputs the information to the computing process section 3. In this embodiment, the current position detection section 4 corresponds to the "current position detection means" of the present invention.

The display input section 7 includes a display screen such as a liquid crystal display device, a touch panel or operation switch interconnected with the display screen, and the like. The voice output section 8 includes a speaker, an amplifier, and the like. The display input section 7 and the voice output section 8 are connected to the computing process section 3, and perform display, voice output, and the like for current position display, route search between two locations, course guidance, destination retrieval, and the like according to the operation of the computing process section 3. The display input section 7 accepts an operation input by a user and outputs the content of the operation input to the computing process section 3. In this embodiment, the computing process section 3 described above, the display input section 7, and the voice output section 8 form a "guidance information output means 9" of the present invention.

The communication section 6 is a function section for performing communication with the map update server device 11 described below. In this example, the communication section 6 is capable of performing wireless data exchange with a wireless base station 20 (see FIG. 5). As a method of such wireless communication, a known communication network, for example, a mobile phone network or wireless local area network (LAN) may be used. Accordingly, the communication section 6 is capable of communicating with the map update server device 11 via the wireless base station 20 and a communication network 19 such as the Internet, as shown in FIG. 5. Thus, the navigation device 1 can receive update data D3 transmitted from the map update server device 11. Note that, although omitted in the drawing, the communication section 6 is preferably capable of a wire or wireless communication with an update terminal of a user, a dealer of the navigation device 1, or the like. Accordingly, the navigation device 1 is capable of receiving the update data D3 transmitted via the communication network to the update terminal.

Next, the configuration of the map update server device 11 which delivers the update data D3 for updating the road map data RD of the navigation device 1 is described. FIG. 5 is a block diagram showing a schematic configuration of the map update server device 11. In this embodiment, the map update server device 11 generates the update data file Df, based on an original map database 12 storing original map data D1 which is updated by input data from an update input section 16 and a comparison map database 13 storing comparison map data D2 having the same content as that of the road map data RD in the map database 2 of the navigation device 1. The map update server device 11 stores the generated update data file Df in an update database 14, and delivers the update data file Df to the navigation device 1 via a communication section 18 when communicating with the navigation device 1. Accordingly, as shown in FIG. 5, the map update server device 11 includes the original map database 12, the comparison map database 13, the update database 14, a computing process section 15, the update input section 16, a memory 17, and the communication section 18. In each of these function sections of the map update server device 11, one or both of hardware and software (program) is installed to form the function section for performing various processes with respect to input data, with the computing process section 15 formed of a central processing unit (CPU) and the like as a main member. The configuration of each section is described below.

The original map data D1 stored in the original map database 12 is map data having a data structure in which each link L for forming the road network data is represented by a combination of the permanent ID as the link ID and the attribute data. FIG. 6 is a diagram schematically showing the structure of such original map data D1. Although omitted in the drawing, the attribute data of each link L includes the same information as that of the attribute data of the link L and the node N at the end portion thereof included in the road map data RD described above. The original map data D1 is updated by the input data from the update input section 16. The update input section 16 has, for example, a display device such as a monitor and an input device such as a keyboard and mouse. The content of the original map data D1 is displayed on a display device via the computing process section 15, so that an operator can input new road map information using the input device to perform an update while checking the content of the original map data D1. That is, the operator can update the content of the original map data D1 via the update input section 16 based on information relating to a change of the road obtained from a field investigation, an aerial photograph, and the like. Upon the update of the original map data D1, the permanent ID of the existing link L is not changed, whereas the permanent ID which does not overlap with each existing link L is assigned to a newly generated link L.

The comparison map data D2 stored in the comparison map database 13 has the same content as that of the road map data RD stored in the map database 2 of the navigation device 1. That is, the comparison map data D2 includes the road network data Rn of a plurality of levels (Rn1 to Rn3) in a hierarchical structure, in the same manner as the road map data RD. Therefore, each link L in the comparison map data D2 is assigned with the link ID of either the serial ID or the permanent ID as a non-overlapping unique ID (identifier) for identification. Note that a further description would overlap with the description of the configuration of the road map data RD, and therefore is omitted. The content of the comparison map data D2 is updated to match the content of the road map data RD after the update based on the updated original map data D1, after the update data file Df is generated. Accordingly, the content of the comparison map data D2 is constantly maintained to be the same as the content of the road map data RD of the navigation device 1 updated by the update data file Df. Thus, in this embodiment, the comparison map database 13 also corresponds to the "road map data storage medium" storing the road map data RD of the present invention.

The update data file Df stored in the update database 14 is a file merging data of portions to be updated with respect to the road map data RD stored in the map database 2. The update data file Df is generated by the computing process section 15 which operates according to an update data generation program PG3 stored in the memory 17, and stored in the update database 14. In this example, the update data file Df is a file of differential data generated by comparing the updated road map data RD generated based on the original map data D1 and the comparison map data D2 stored in the comparison map database 13, and extracting the difference thereof.

The computing process section 15 is a computing process function section which operates according to the update data generation program PG3 and an update data transmission program PG4 stored in the memory 17, and is formed of a known computing process means such as a CPU as described above. The update data generation program PG3 is a program for generating the update data file Df based on the updated original map data D1 and the comparison map data D2, in the case where the original map data D1 is updated. The update data transmission program PG4 is a program for transmitting the update data file Df generated according to the update data generation program PG3 to the navigation device 1. The operation process of the computing process section 15 according to the update data generation program PG3 and the update data transmission program PG4 is described below in detail based on the flowcharts shown in FIG. 7 and FIG. 8.

The communication section 18 is a function section for performing communication with the navigation device 1. In this example, the communication section 18 is capable of communicating with the navigation device 1 via the communication network 19 such as the Internet and the wireless base station 20. Accordingly, the communication section 18 is capable of transmitting the update data file Df to the navigation device 1.

Figure 7:
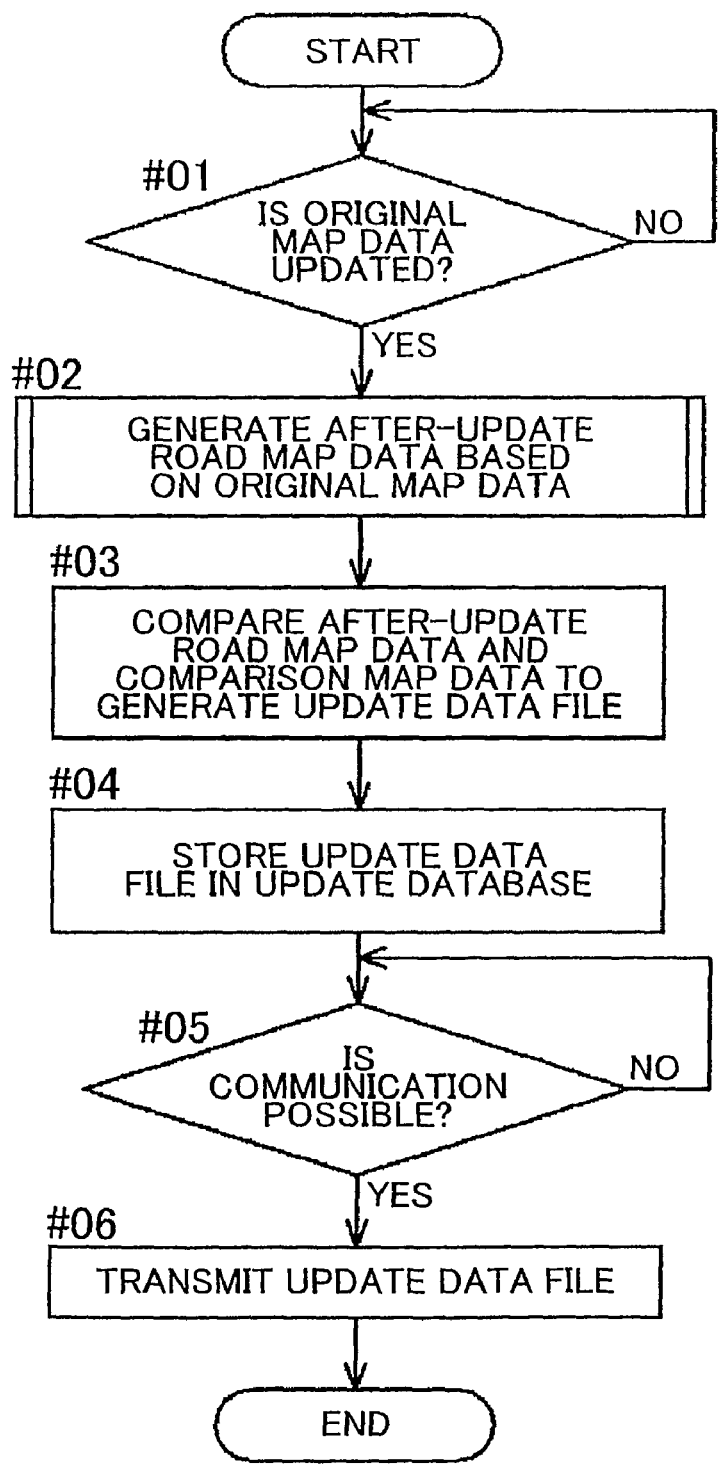
FIG. 7 is a flowchart showing an entire operation process of generating and transmitting update data by the map update server device.
Figure 8:
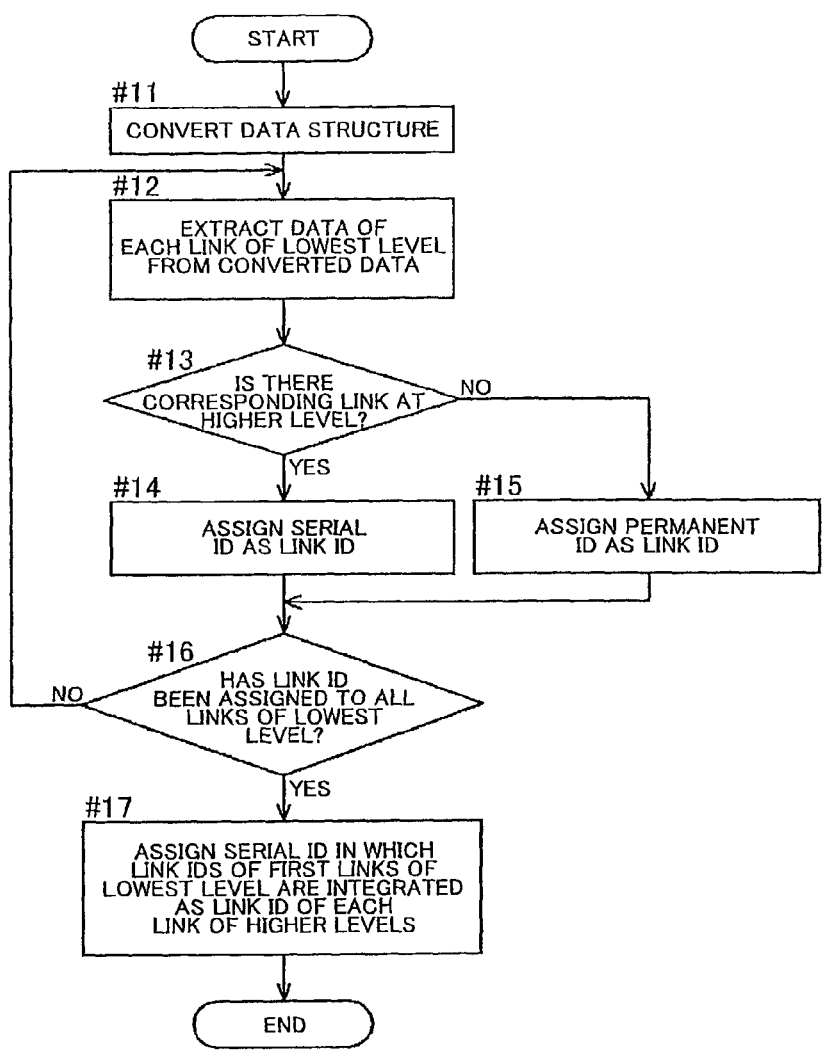
FIG. 8 is a flowchart showing the detail of a generation process of road map data after update.

Next, the operation process of the computing process section 15 according to the update data generation program PG3 and the update data transmission program PG4 in the map update server device 11 is described based on the flowcharts shown in FIG. 7 and FIG. 8. FIG. 7 is a flowchart showing the entire operation process of the computing process section 15 according to the update data generation program PG3 and the update data transmission program PG4. FIG. 8 is a flowchart showing the detail of a process of generating after-update road map data RDr in step #02 of FIG. 7.

First, the flowchart of FIG. 7 is described. In the case where the original map data D1 is updated by input data from the update input section 16 (step #01: Yes), the computing process section 15 generates the after-update road map data RDr based on the original map data D1 according to the update data generation program PG3 (step #02). The detail of the process of step #02 is described below using the flowchart of FIG. 8. The generated after-update road map data RDr is the same as the comparison map data D2 and the road map data RD stored in the map database 2 of the navigation device 1 other than that an update has been performed in accordance with the update content of the original map data D1, and these pieces of data all have the same data format. The after-update road map data RDr generated in step #02 is temporarily stored in the memory 17. Next, the computing process section 15 compares the after-update road map data RDr and the comparison map data D2 stored in the comparison map database 13 and generates the update data file Df (step #03) according to the update data generation program PG3. Specifically, the after-update road map data RDr and the comparison map data D2 are common other than that there is a difference in the data contents before and after the update due to the update of the original map data D1, and have the same data format for comparison. The update data file Df can be generated by extracting and filing differential data between the comparison map data D2 as the reference and the after-update road map data RDr.

Then, the computing process section 15 stores the update data file Df generated in step #03 in the update database 14 (step #04). After that, the communication section 18 determines whether or not communication is possible with the navigation device 1 (step #05). Note that, as described above, the communication section 18 performs the communication with the navigation device 1 via the communication network 19, the wireless base station 20, and the like. In the case where communication is possible (step #05: Yes), the computing process section 15 transmits the update data file Df to the navigation device 1 via the communication section 18 (step #06). The process of the map update server device 11 is thus completed. Note that, in the navigation device 1 which has received the update data file Df, the computing process section 3 is operated according to the update program PG2 to perform an update of the road map data RD in the map database 2 (see FIG. 1).

Next, the detail of the process of generating the after-update road map data RDr of step #02 described above is described based on the flowchart of FIG. 8. First, the computing process section 15 converts the data structure of the original map data D1 to the same structure as that of the road map data RD, i.e., a structure including the road network data Rn in a hierarchical structure of a plurality of levels, according to the update data generation program PG3 (step #11). Then, each link L of level 1 which is the lowest level is extracted from the converted data (step #12), and a process of assigning the link ID to each extracted link L is performed. Specifically, it is determined whether each link L of level 1 has a corresponding link existing at level 2 as a higher level (step #13).

The first link L1, which is the link L having a corresponding link existing at a higher level (step #13: Yes), is assigned with the serial ID as the link ID (step #14). As described above, the serial IDs are IDs formed of consecutive numbers and the like according to the connection order of each link L in the link line ML. In the assignment of the serial ID, the serial ID used in the comparison map data D2 which is the data before the update is preferably used without change as much as possible, in order to reduce the amount of change of the road map data RD by the update. That is, for the link L which has not been changed from the comparison map data D2, the same link ID as the comparison map data D2 is used in the after-update road map data RDr. For the link L which has been changed from the comparison map data D2, the link ID is assigned such that the consecutiveness of the serial IDs are maintained and the change is minimized.

Figure 9:
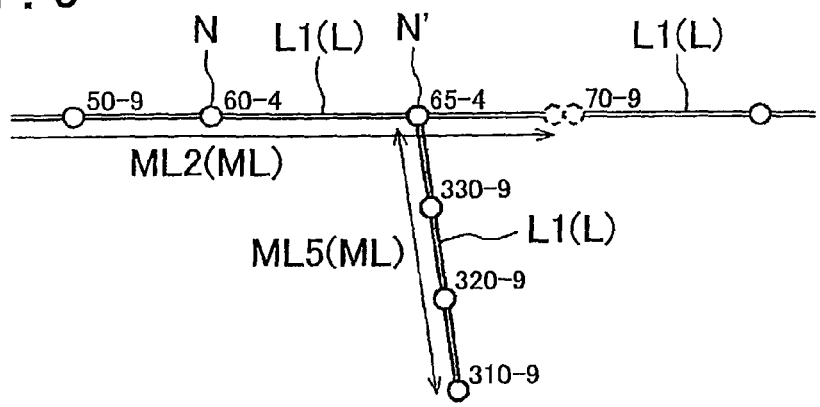
FIG. 9 is a diagram showing an example of the setting of a serial ID as the link ID.

As an example, a case where a node N' and a link line ML5 are newly added, as shown by the bold line in FIG. 9, in the existing first link L1 of which the link ID shown in FIG. 3 is "60-9" is described. In this example, the added link line ML5 is formed of the first link L1. In this case, it is preferable to segment the link ID of the existing first link L1, and use the later half of the link ID as the link ID of the first link L1 subsequent to the added node N'. In the example shown in the drawing, the link ID of the existing first link L1 of which the link ID before the update has been "60-9" is segmented into two. The link ID of the first link L1 between the existing node N and the added node N' is "60-4," and the link ID of the first link L1 subsequent to the added node N' is "65-4." Since each first link L1 forming the added link line ML5 forms a link line ML different from the existing link line ML2, each first link L1 is assigned with the serial ID, for example, "300-9," "310-9," and "320-9," independent from the existing link line ML2.

The second link L2, which is the link L having no corresponding link existing at a higher level (step #13: No), is assigned with the permanent ID as the link ID (step #15). As described above, the permanent ID is an ID formed of a number and the like irrelevant with the connection order of the links. In the assignment of the permanent ID, the same ID as the link ID assigned to each link L in the original map data D1 (see FIG. 5) is preferably used. That is, as shown in FIG. 6, the original map data D1 has a data structure in which each link L for forming the road network data is represented by a combination of the permanent ID as the link ID and the attribute data. Thus, a process of selecting a new ID, checking whether the ID overlaps with another ID, and the like upon the assignment of the permanent ID as the link ID of a newly added link L becomes unnecessary by using the permanent ID without change used as the link ID of the original map data D1. Therefore, the computing process of the computing process section 15 for assigning the link ID can be simplified. Further, since the same permanent ID is used as the link ID, the correspondence relation of the links L between the original map data D1 and the after-update road map data RDr can easily be recognized.

Figure 10:
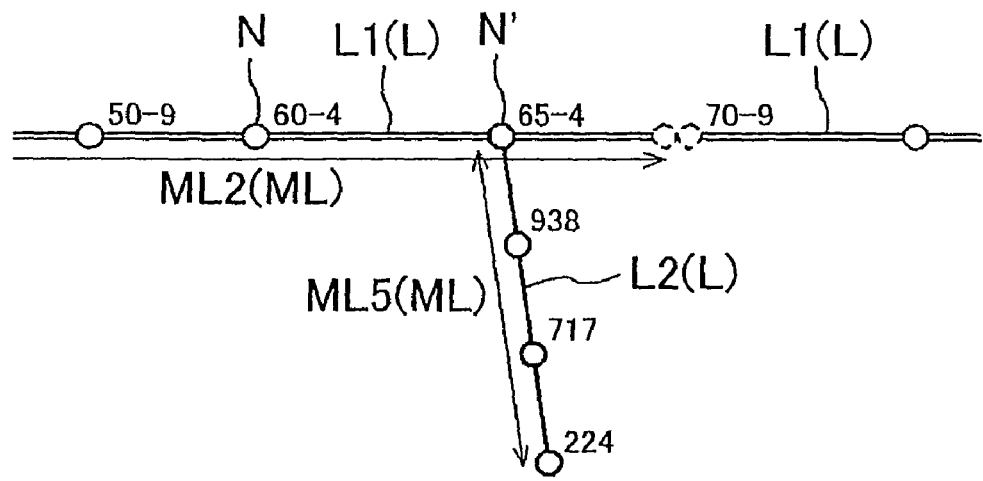
FIG. 10 is a diagram showing an example of the setting of the serial ID and a permanent ID as the link ID.
Figure 11:
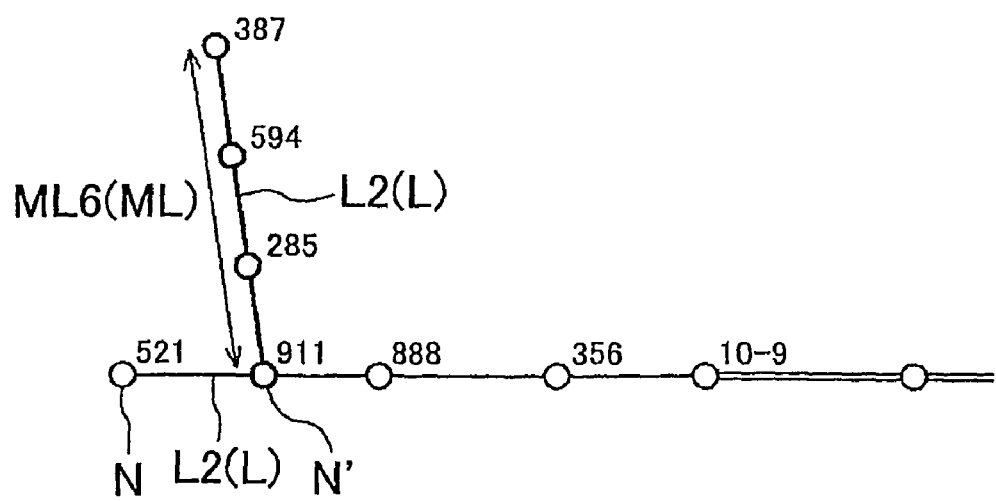
FIG. 11 is a diagram showing an example of the setting of the permanent ID as the link ID.

Specific examples shown in FIG. 10 and FIG. 11 are described. FIG. 10 shows an example of a case where the node N' and the link line ML5 are newly added, as shown by the bold line in FIG. 10, in the existing first link L1 of which the link ID shown in FIG. 3 is "60-9," in the same manner as that of FIG. 9 described above. Note that the added link line ML5 is formed of the second link L2. In this case, the link ID of the existing first link L1 is segmented, whereby the link ID of the first link L1 between the existing node N and the added node N' is "60-4," and the link ID of the first link L1 subsequent to the added node N' is "65-4," in the same manner described above. Since each link L forming the added link line ML5 is the second link L2, each link L is assigned with the permanent ID. Specifically, the links L are assigned with numbers "224," "717," and "938" as the permanent ID in the order of distance from the link line ML2, from the farthest to the nearest. FIG. 11 shows an example of a case where the node N' and a link line ML6 formed of the second link L2 are newly added, as shown by the bold line in FIG. 11, in the existing second link L2 of which the link ID shown in FIG. 3 is "521." In this case, a new permanent ID "911" is assigned as the link ID of the link L subsequent to the newly added Node N'. Each link L forming the added link line ML6 is assigned with the number "387," "594," and "285" as the permanent ID in the order of distance from the existing link "521," from the farthest to the nearest. The permanent IDs are the same IDs as the link IDs of each link L assigned in the original map data D1 (see FIG. 5).

After the link ID of each link L is assigned as described above, it is determined whether or not the link ID is assigned to all links L of level 1 which is the lowest level (step #16), as shown in FIG. 8. Until the link ID is assigned to all links L of level 1 (step #16: No), the processes of steps #12 to #15 are repeated. After the link ID is assigned to all links L of level 1 (step #16: Yes), the serial ID formed by integrating the link IDs of the first links L1 of level 1 which is the lowest level is assigned as the link ID of each link of level 2 and level 3 which are higher levels (step #17). After the link ID is assigned to all links L included in the road map data RD, the process of generating the after-update road map data RDr is completed.

Other Embodiments (1) In the embodiment described above, the case where the serial IDs as the link IDs of the first links L1 are consecutive serial IDs with number ranges of 10 has been described as an example. However, the number range of the serial ID is not limited thereto, and other number ranges of 5, 20, 50, 100, and the like are also preferable. Setting the serial IDs with different number ranges depending on the attribute such as the road type, length, and the like of each link L is also one preferred embodiment.

(2) In the embodiment described above, the case where the serial ID as the link ID of the first link L1 is represented by a combination of the lower limit number in the number range and the difference between the lower limit and the higher limit has been described. However, the configuration of the serial ID is not limited thereto. For example, the serial ID may be represented by each number of the lower limit and the higher limit in the number range, such as "10 to 19," "20 to 29," and "30 to 39." The serial ID may also be set as a single number not having a range. In that case, the link ID of the first link L1 may be, for example, "1," "2," "3," . . . and the like in the connection order of the links in the link line ML.

(3) In the embodiment described above, the case where the permanent ID as the link ID of the second link L2 is the same ID as the link ID assigned in the original map data D1 has been described as an example. However, a configuration in which the permanent ID is assigned to the second link L2 of the road map data RD in a manner irrelevant with the original map data D1 is also commonly possible.

(4) In the embodiment described above, an example of the case where the existing permanent ID is used without any change for the link ID of the second link L2 other than the newly added link upon the update of the second link L2 has been described. However, there is a possibility of the number of digits of the permanent ID becoming insufficient in the future if the update of the second link L2 is repeated. Thus, a configuration in which an update is performed to increase the number of digits for a part or all of the existing permanent IDs assigned to the second links L2 without changing the ID number is also one preferred embodiment of the present invention. In this case, the number of digits of the permanent ID of all existing second links L2 may be increased simultaneously, or the number of digits of the permanent ID may be increased for those within a unit of the links or parcels involved in an update such as the addition of the new node N, the link L, and the like. For example, in the example of FIG. 11, it is preferable to perform an update such that the link ID added with the new node N' is "000521" in which the number of digits of the link ID (permanent ID) "521" of the existing second link L2 is increased, and that the permanent IDs of the newly added second links L2 be "000911," "000387," "000594," and "000285." It is also preferable to simultaneously perform an update of increasing the number of digits of the link ID of the other existing second links L2 in the periphery.

(5) In the embodiment described above, the versions of the comparison map data D2 and the update data file Df have not been described. However, in the case of performing an update of the road map data RD of a plurality of the navigation devices 1, a configuration in which data of a plurality of versions including an old version of the comparison map data D2 and the update data file Df is stored in the comparison map database 13 and the update database 14 according to the update state of each navigation device 1 is preferable. That is, there may be a case where a frequent communication with the map update server device 11 is not possible for all of the plurality of the navigation devices 1, whereby the navigation device 1 having the old road map data RD which has not been updated and the navigation device 1 having the road map data RD which has been updated by the latest update data file Df both exist. In order to enable the update of the road map data RD for all navigation devices 1, a configuration in which the road map data RD, the comparison map data D2, and the update data file Df each include version information is preferable. All update data files Df of a later version than the version of the road map data RD included in the navigation device 1 are used to update the road map data RD. Accordingly, the update of the road map data RD can be performed appropriately depending on the update state of each navigation device 1.

(6) In the embodiment described above, the case where the structure of the road map data RD according to the embodiment of the present invention is applied to the road map data of the navigation device 1 has been described as an example. However, the scope of application of the present invention is not limited thereto, and the present invention may be applied to road map data used for other applications such as a map database for destination retrieval.

INDUSTRIAL APPLICABILITY

The present invention can be utilized as a data structure of road map data used in, for example, a navigation device, a map database, or the like and a method of generating such road map data.

The invention claimed is:

1. A device for generating road map data which includes road network data, representing roads by a connection relation of a plurality of links, in a hierarchical structure of a plurality of levels, the device comprising:
a control unit that:
extracts links existing at a lowest level; and
assigns a link ID to each of the extracted links by:
assigning consecutive serial IDs to first links among the extracted links, the first links each having a corresponding link existing at a higher level, and the consecutive serial IDs being IDs consecutive according to a connection order of the links within a link line formed of a plurality of the consecutive links having a common attribute; and
assigning a permanent ID to a second link among the extracted links, the second link not having a corresponding link existing at the higher level, and the permanent ID being an ID irrelevant to the connection order of the links.

2. The device for generating road map data according to claim 1, wherein the serial IDs are set as a number range including a plurality of consecutive numbers.

3. The device for generating road map data according to claim 1, wherein the permanent ID is the same as an ID assigned to each link in original map data from which the road network data is generated.

4. The device for generating road map data according to claim 1, wherein data representing the link ID comprises a permanent ID identification flag representing whether or not the link ID is the permanent ID.

5. A navigation device comprising:
a map database storing road map data which includes road network data, representing roads by a connection relation of a plurality of links, in a hierarchical structure of a plurality of levels;
current position detection means which detects a current position;
a memory which stores an application program which refers to the road map data for operation; and
a control unit that:
operates according to the application program stored in the memory to output guidance information; and
performs a process of updating the road map data based on an update data file supplied from a map update server device:
wherein the road map data has a structure, in which:
a link ID is assigned to each link in the road map data as a non-overlapping unique identifier for identifying each link;
consecutive serial IDs are assigned to first links existing at a lowest level, the first links each having a corresponding link existing at a higher level, and the consecutive serial IDs being IDs consecutive according to a connection order of the links within a link line formed of a plurality of the consecutive links having a common attribute; and a permanent ID is assigned to a second link existing at the lowest level, the second link not having corresponding link existing at the higher level, and the permanent ID being an ID irrelevant with the connection order of the links.

6. The device for generating road map data according to claim 1, further comprising:

an original map database storing original map data having a data structure, in which each link to form road network data is represented by a combination of a permanent ID and attribute data, wherein wherein the control unit:

converts the data structure of the original map data to a structure including the road network data in a hierarchical structure of a plurality of levels;

extracts links existing at a lowest level from the converted data structure of the original map data and assigns the consecutive serial IDs to the first links and the permanent ID to the second link.

7. A method of generating road map data, the road map data representing roads by a connection relation of a plurality of links, in a hierarchical structure of a plurality of levels, the method comprising:

extracting, with a control unit, links existing at a lowest level;

assigning a link ID to each of the extracted links by:

assigning, with the control unit, consecutive serial IDs to first links among the extracted links, the first links each having a corresponding link existing at a higher level, and the consecutive serial IDs being IDs consecutive according to a connection order of the links within a link line formed of a plurality of the consecutive links having a common attribute; and assigning, with the control unit, a permanent ID to a second link among the extracted links, the second link not having a corresponding link existing at the higher level, and the permanent ID being an ID irrelevant to the connection order of the links.

\* \* \* \* \*